United States Patent [19]

Tittel, Eberhard

[11] Patent Number: 4,930,671
[45] Date of Patent: Jun. 5, 1990

[54] ATTACHMENT, PARTICULARLY FOR HOLDING SKIS, SURFBOARDS OR THE LIKE, FOR A CARRIER BAR OF A CARRIER STRUCTURE FOR FITTING EXTERNALLY ON A MOTOR VEHICLE

[76] Inventor: Tittel, Eberhard, Lagerstrssae 1, D-7981 Grünkraut-Gullen, Fed. Rep. of Germany

[21] Appl. No.: 273,793

[22] Filed: Nov. 21, 1988

[51] Int. Cl.$^5$ .................................................. B60R 9/04
[52] U.S. Cl. .................................. 224/319; 224/315; 224/917; 224/329; 280/814
[58] Field of Search ............... 224/309, 315, 319, 322, 224/323, 324, 225, 917, 729; 280/814

[56] References Cited

U.S. PATENT DOCUMENTS

| 3,836,058 | 9/1974 | Penniman et al. | 224/315 |
| 3,848,785 | 11/1974 | Bott | 224/319 |
| 4,326,654 | 4/1982 | Frey | 224/315 |
| 4,461,414 | 7/1984 | Gieber | 224/315 |
| 4,516,709 | 5/1985 | Bott | 224/315 |
| 4,720,031 | 1/1988 | Zimmerman | 224/323 |
| 4,817,838 | 4/1989 | Kamaya | 224/319 |

FOREIGN PATENT DOCUMENTS

| 2950449 | 6/1981 | Fed. Rep. of Germany | 224/315 |
| 8124159 | 1/1982 | Fed. Rep. of Germany | |
| 3201409 | 9/1983 | Fed. Rep. of Germany | 224/315 |
| 3744611 | 7/1988 | Fed. Rep. of Germany | 224/917 |

Primary Examiner—Ernest G. Cusick
Attorney, Agent, or Firm—Marshall, O'Toole, Gerstein, Murray & Bicknell

[57] ABSTRACT

A ski-carrier attachment is provided on its lower clamping part with two claws that open in opposite directions. It also has a third claw and plate for securing one of the claws. Mounting the ski-carrier attachment on the carrier bar of an automobile roof carrier is done by placing the ski-carrier attachment on the carrier bar at right angles thereto, so that the carrier bar lies between the two first-mentioned claws. The ski-carrier attachment is then turned through 90° and locked in this position by the plate.

2 Claims, 3 Drawing Sheets

ATTACHMENT, PARTICULARLY FOR HOLDING SKIS, SURFBOARDS OR THE LIKE, FOR A CARRIER BAR OF A CARRIER STRUCTURE FOR FITTING EXTERNALLY ON A MOTOR VEHICLE

TECHNICAL FIELD OF THE INVENTION

The invention relates to an attachment, particularly for holding skis, surf-boards or the like, for a carrier bar of a carrier structure for fitting externally on a motor vehicle, the attachment being provided with fastening means for fastening it releasably to the carrier bar.

BACKGROUND OF THE INVENTION AND PRIOR ART

Such an attachment for holding skis is known from German Utility Model 81 24 159. This known ski-holder attachment consists of a lower and an upper tubular part hinged together at one end. The upper tubular part carries at its other end a locking part in the form of a locking cap, which is hinged to the upper tubular part. By means of the locking part the two tubular parts can be locked together in the closed position. On their facing sides the two tubular parts carry rubber lips in which the skis can be clamped. Attached to the lower side of the lower tubular part are closed pipe clips by means of which the ski-carrier attachment can be pushed onto the carrier bar. To prevent slipping there are screws in the closed clips by means of which the ski-carrier attachment can be secured to the carrier bar. If the ski-carrier attachment is to be removed from the carrier bar, for example in order to transport loads on the roof carrier or to fix another attachment to the carrier bar, the carrier bar must first be released from its mounting on the car roof before the ski-carrier attachment can be withdrawn from the carrier bar. Releasing the carrier bar from its mounting is however troublesome and sometimes also difficult, in particular since the mounting and the carrier bar may be corroded or dirt on the carrier bar on the mounting may make it difficult to move the carrier bar in the hole in the mounting. The same applies to the replacement of the carrier bar in its mounting.

OBJECT OF THE INVENTION

The object of the invention is therefore to provide an attachment of the kind described above whose fitting, removal of exchange is considerably easier to perform and in particular does not require the carrier bar to be removed from its mounting.

SUMMARY OF THE INVENTION

This object is achieved according to the invention if at least one of the fastening means comprises a claw that is open to one side and can be pushed on to the carrier bar.

The claw allows the attachment to be moved sideways on the carrier bar without this having to be removed from its mounting.

An advantageous development of the invention may consist in providing as a fastening means on the attachment a further claw, open to one side, whose spacing from the first claw is the same or slightly greater than the corresponding diameter of the carrier bar, and in the two claws being open in opposite directions. This form of attachment can be placed on the carrier bar at right angles thereto, so that the carrier bar lies between the two claws. By turning the attachment so that it extends parallel to the carrier bar, the two claws can be brought into a position in which they engage over the carrier bar.

It is advantageous also to provide as a fastening means on the attachment, spaced from the further claw on the side thereof facing away from the first claw, a third claw that opens in the same direction as the further claw.

Finally yet another fastening means can be provided on the attachment to prevent the third claw from being stripped off from the carrier bar that is inserted into it.

If the attachment is, as is known, constructed as a ski-holder consisting of two elongated elements for clamping the skis which are hinged together at one end and can be connected at their other ends by a locking means, the claw or claws should be disposed on the side of one of the two clamping elements that faces away from the other clamping element, the claw or claws being open in the direction at right angles to the plane defined by the two clamping elements.

If the locking means of such a ski-carrier attachment is provided with a lock, a further advantageous development of the invention can consist in a connecting piece extending between the lock and the additional fastening means, by means of which the additional fastening means can be secured against release when the lock is closed. It is possible in this way, by operating the lock, not only to prevent the two clamping elements from being swung apart and the ski removed, but furthermore it is also possible to prevent the ski-carrier attachment as a whole, together with the ski in it, from being removed from the carrier bar.

If, as is known, the clamping elements of the ski-carrier attachment comprise tubular parts, it is proposed in a further aspect of the invention that the additional fastening means should comprise a plate that is releasably screwed laterally on to the respective tubular part and projects beyond the edge of the tubular part remote from the other tubular part, that a bent section with a hole in it is provided on the plate that projects through an opening in the wall of the tubular part into the interior of the tubular part, that the connecting piece is in the form of a rod and extends from the locking means through the tubular part to the bent section of the plate, and that the rod-shaped connecting piece is displaceable, when the lock is operated so that it assumes its closed position, so that it engages through the bent section of the plate and thereby prevents the removal of the plate from the tubular part.

The rod-shaped connecting piece can be provided with a lateral peg by means of which it engages in a longitudinal slit in the tubular part, can be displaced therein and is accessible from outside. In this way the rod-shaped connecting piece can, when the lock is open, be removed manually from the hole in the bent section of the plate.

A possible alternative way of connecting a rod-shaped connecting piece that extends through the tubular clamping part can consist in that the locking means has a projection, at least on the side to which the third claw is open, and that the projection engages over the clamping element carrying the claw or claws when the clamping elements lie close together, and thus prevents the third claw from being stripped away from the carrier bar.

If, as is known, the carrier bar has a rectangular cross-section, each claw, to match the carrier bar, can have at least two regions bent at right angles to one another, of which the first serves as a seat for one side of the carrier bar and the second to engage behind the carrier bar, and the end of the second region that is not connected to the first region forms one end of the claw opening. Furthermore the other end of the claw opening can be formed by the clamping element carrying the claw or by a third region of the claw that likewise proceeds from the first region, is bent at right angles thereto, and forms with the two other regions a roughly rectangular U, the third region—if it is present—being arranged on the side of the clamping part carrying the claw that is remote from the other clamping part.

BRIEF DESCRIPTION OF THE DRAWINGS

Exemplary embodiments of the invention will now be described with reference to the drawings, in which.

DETAILED DESCRIPTION OF A PREFERRED EMBODIMENT OF THE INVENTION

Figure 1:
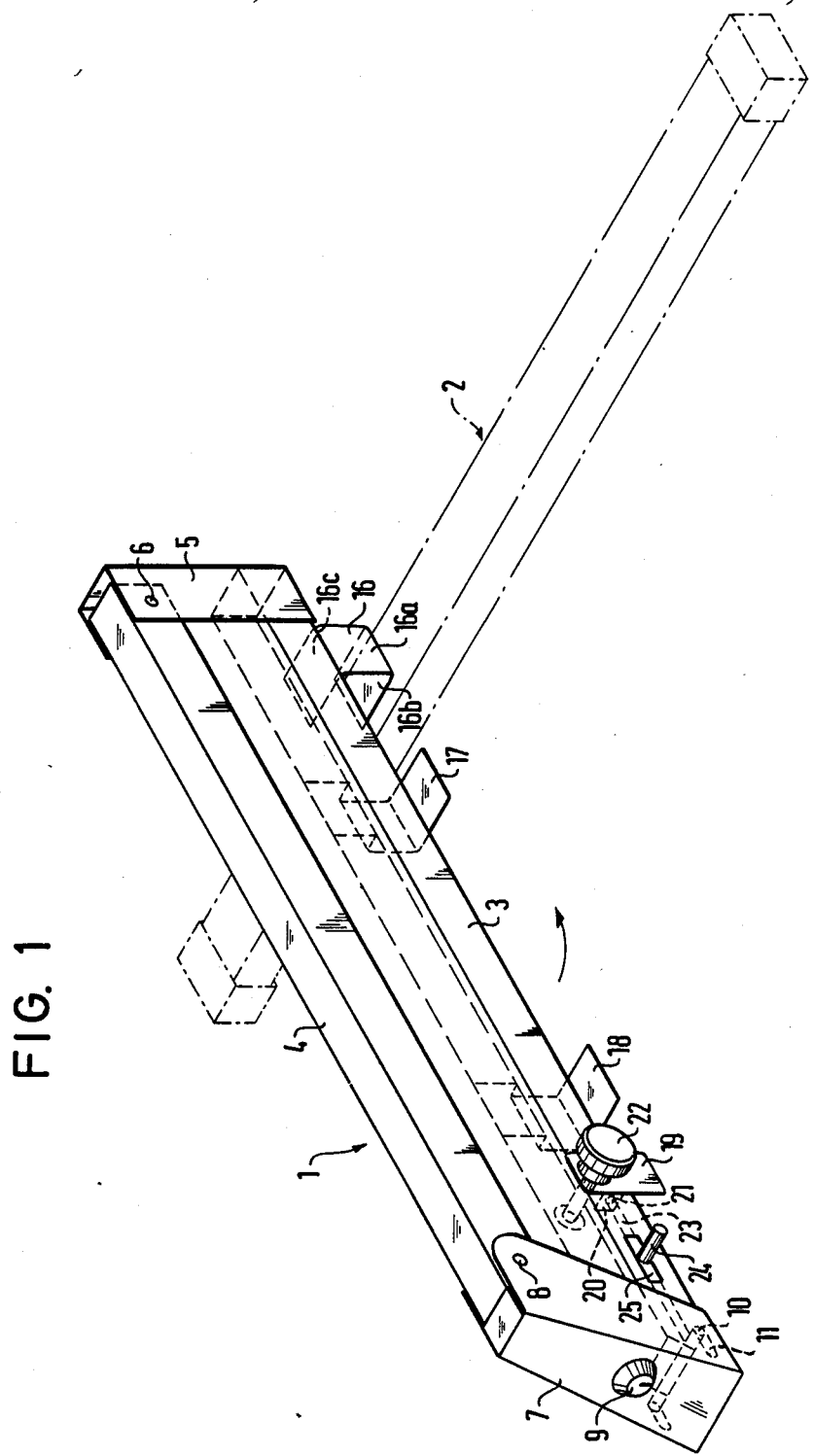
FIG. 1 is a perspective view of a first embodiment of a ski-carrier attachment.

The ski-carrier attachment 1 shown in FIG. 1 is intended to be mounted on the carrier bar 2 of a roof-carrier structure of an automobile, not further illustrated. The ski-carrier attachment 1 has a lower tubular part 3 from one end of which a connecting piece 5 extends upwards. An upper tubular part 4 is connected at one end to the connecting piece 5 by a link 6. At the other end of the upper tubular part 4 there is a locking cap 7 that can pivot about a link 8. The locking cap 7 is provided with a lock 9.

Figure 2:
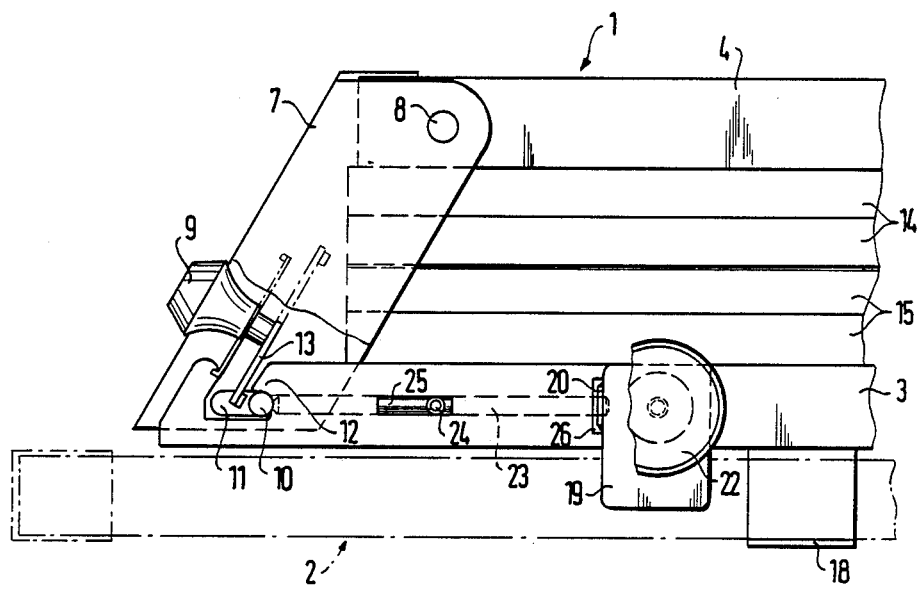
FIG. 2 is an enlarged detail of FIG. 1.

As can be seen more particularly from FIG. 2, a locking pin 10 is displaceably spring-housed in slits 11 of the locking cap 7. The spring (not shown) urges the locking pin to the right. The lock 9 is provided with a lock tongue 13. In the closed position the lock tongue 13 is at the bottom, and in the open position, shown in broken lines, at the top. In the closed position, the lock tongue 13 holds the locking pin 10 in the position shown in FIG. 2. In the closed position of the ski-carrier attachment the locking pin 10 engages behind a detent 12 on the lower tubular part 3. The detent is chamfered at the top, so that when the locking cap 7 is down the locking pin engages resiliently behind the detent 12. Opening of the locking pin is effected by a rod-shaped connecting piece 23, which also has a further function which will be explained later. The rod-shaped connecting piece 23 is provided with a lateral peg 24 which engages through an elongated slit 25 in the wall of the lower tubular part 3 and is therefore accessible from outside. Thus, by grasping the peg 24 and moving the peg to the left it is possible to move the locking pin 10 to the left out of its locking position against the force of the spring (not shown), provided the lock tongue 13 is not in the closed position.

On the underside of the lower tubular part 3 there are three claws 16, 17, 18. The claw 16 has the form of a rectangular U with a first region 16a, a second region 16b and a third region 16c. The first region 16a serves as the seating for one side of the carrier bar 2. The second region 16b serves to engage beneath the carrier bar 2. By means of the third region 16c the claw 16 is fixed to the underside of the tubular part 3, for example by welding.

The two claws 17 and 18 can be constructed in the same way as the claw 16. However in FIG. 1 the claws 17 and 18 are formed rather differently in that the third region is here again bent and is fixed to a side of the tubular part 3. It is important that the openings of the two claws 16 and 17 point in opposite directions. The distance between the claws 16 and 17 is made such that it is the same as or slightly greater than the corresponding breadth of the carrier bar 2. The claw 18 opens towards the same side as the claw 17.

From FIG. 1 it can be seen how the ski-carrier attachment is put on the carrier bar 2, namely in such a way that the two form a right angle with the carrier bar lying between the two claws 16, 17. The ski-carrier attachment 1 is then turned through 90°, whereby the two claws 16, 17 embrace the carrier bar in opposite senses. The claw 18 then likewise engages over the carrier bar 2. To prevent the ski-carrier attachment 1 being detached again from the carrier bar 2 by corresponding turning in the opposite direction, a plate 19 which projects beyond the lower edge of the lower tubular part 3 is provided on the side of the lower tubular part 3 on which the claw 18 is open. This plate 19 can be screwed on to the lower tubular part by means of a capstan-head screw 22. On the plate 19 there is a bent section 20 with a hole 21 in it. This bent section 20 can be pushed through a slit 26 in the wall of the lower tubular part 3, so that it projects into the interior of the lower tubular part. If the rod-shaped sliding part 23 in FIG. 2 is now pushed from left to right, its right-hand end engages through the hole 21 in the bent section 20 of the plate 19. As a result the plate 19 cannot be removed from the lower tubular part 3 even when the capstan-head screw 22 is released. Consequently removal of the ski-carrier attachment 1 from the carrier bar 2 is in any case not possible if the two tubular parts 3, 4 are locked together by the locking cap 7 and by turning the lock 9 into the closed position.

It should be added that on turning the ski-carrier attachment 1 in the mounting direction indicated by the arrow in FIG. 1 the third claw forms a stop.

Figure 3:
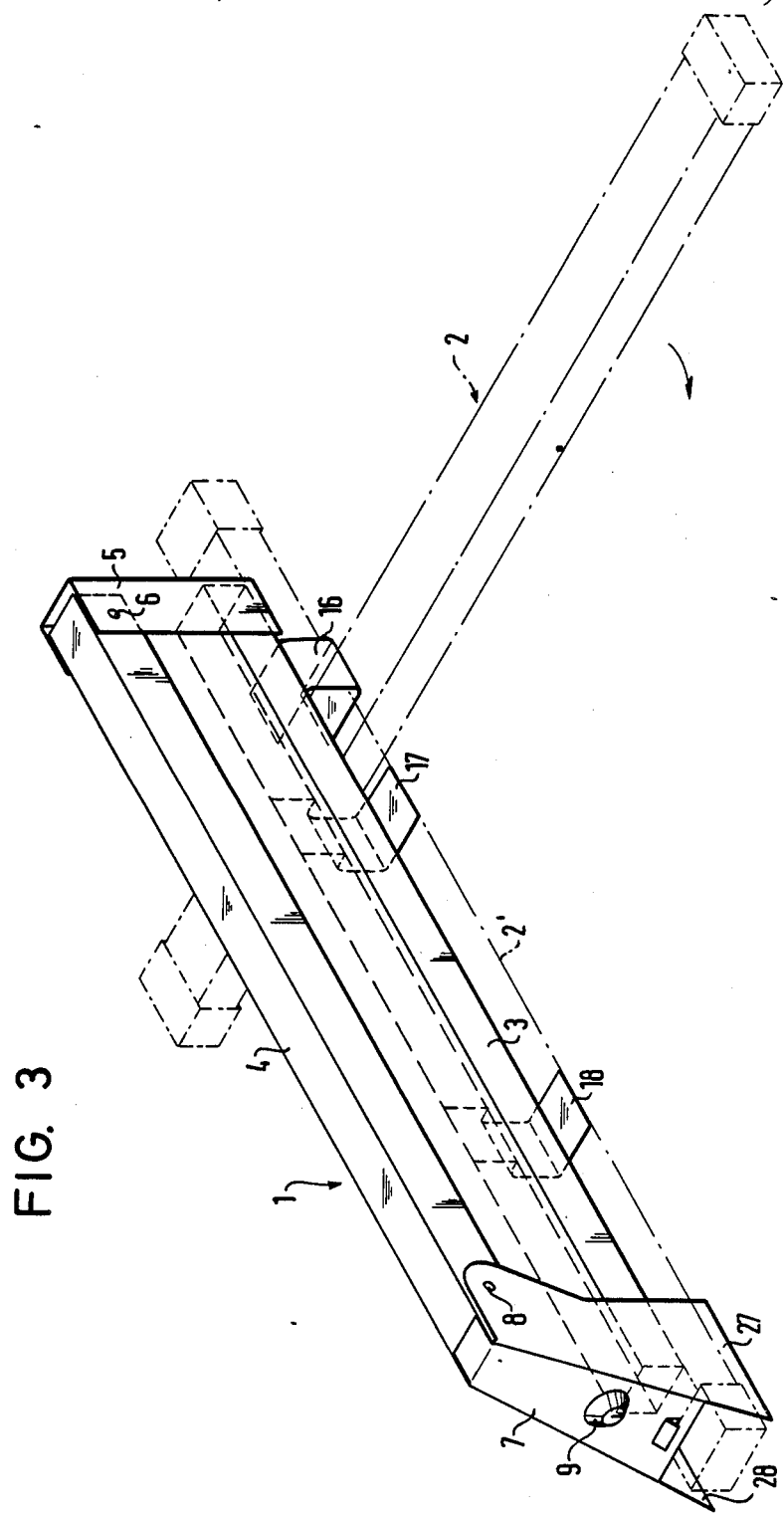
FIG. 3 is a second embodiment of the ski-carrier attachment.

The embodiment of the ski-carrier attachment shown in FIG. 3 makes the plate 19, the capstan-head screw 22 and also the rod-shaped connecting piece 23 unnecessary. Here the locking cap 7 is provided on both sides with projections 27, 28 that engage over the carrier bar 2 when the upper tubular part 4 is lowered. The projection 27 thus takes over the function of the plate 19 in FIG. 1. The projection 28 is thus in principle unnecessary.

In FIG. 3 the arrow indicating the direction of rotation is opposite to the direction of rotation in FIG. 1. This is merely intended to indicate that it is obviously also possible to pivot the carrier bar 2 in the corresponding way. Since however the carrier bar 2 is generally fixed firmly to the automobile, it is normally the ski-carrier attachment 1 that must be rotated. The carrier bar is thus indicated in the normal position by 2 and in the 90° rotated position by 2'.

What is claimed is:

1. An attachment adapted for holding skis, surfboards or the like on a motor vehicle carrier bar, said attachment comprising:

two elongated clamping elements;

means for hinging said clamping elements together at one end of each clamping element;

a locking element for connecting said clamping elements at the ends of said elements opposite said hinge means,
a first claw and a second claw each disposed on one of said clamping elements at a side of said clamping element opposite the other of said clamping elements; and
securing means adapted for securing said attachment to such a carrier bar;
one of said clamping elements comprising a tubular part;
said locking element comprising a connecting piece;
said securing means comprising a plate with a bent section adapted for securing at least one of said claws to such a carrier bar;
said plate being releasably fastenable to said tubular part and, when said plate is fastened to said tubular part, projecting beyond said side of said clamping element on which said claws are disposed;
said bent section of said plate extending into the interior of said tubular part when said plate is fastened to said tubular part; and
said bent section of said plate comprising means for receiving said connecting piece and securing said plate to said tubular part when said locking element is locked.

2. The attachment of claim 1, wherein:
said sliding part is disposed within said tubular part and comprises a lateral peg;
said tubular part comprises an elongate slit; and
said lateral peg engages in said slit and is accessible from outside said tubular part.

* * * * *